UNITED STATES PATENT OFFICE.

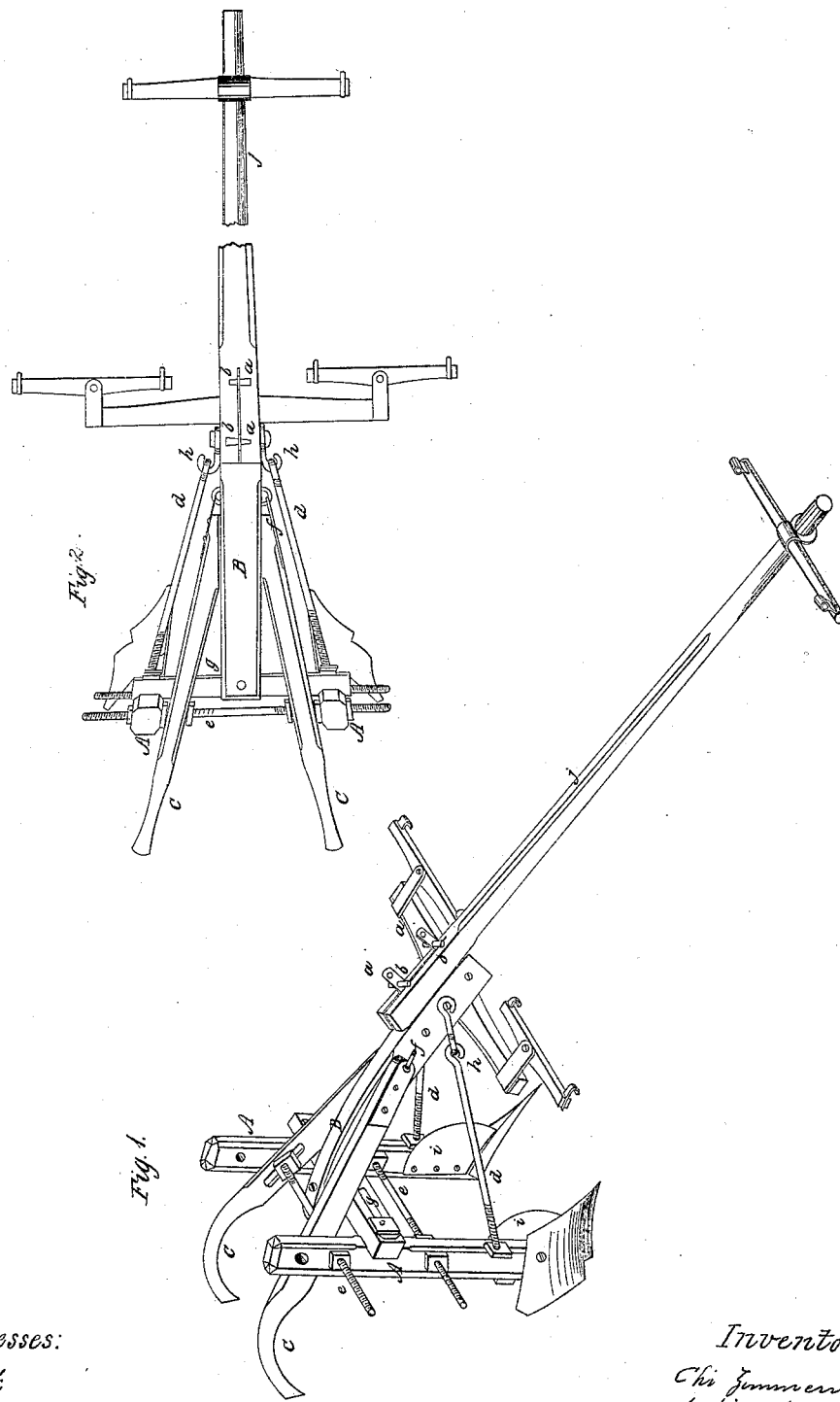

CHRISTIAN ZIMMERMAN, OF COLLINSVILLE, OHIO.

IMPROVEMENT IN PLOWS.

Specification forming part of Letters Patent No. 58,534, dated October 2, 1866.

*To all whom it may concern:*

Be it known that I, CHRISTIAN ZIMMERMAN, of Collinsville, in Butler county, in the State of Ohio, have invented a new and useful Improvement in Plows for Plowing Corn; and I do hereby declare that the following is a full and exact description thereof, reference being had to the accompanying drawings, and to the letters of reference marked thereon.

Figure 1 is a representation of my improved plow in perspective, and Fig. 2 is a top view of the same.

In the drawings, A A indicate the standards, to which the plows are secured or bolted. B is the beam. C C are the handles. The bar $g$ is provided with slots for bolts to secure the standards to the bar $g$. $e\ e$ are screw-rods, also connecting the standards together. The bar $g$ is let into the fronts of standards, gains being cut therein for the purpose of bracing and strengthening the frame. The plow-beam B is fastened to the cross-bar $g$ by a screw or bolt, as represented.

The standards A A may be adjusted to or from each other by means of the bolts and slots in the bar $g$ and the nuts on the screw-rods $e\ e$ on each side of the standards A A. The upper screw-rod $e$ passes through the handles, which are provided with slots for the purpose, and may be adjusted laterally thereon by nuts, as represented in the drawings.

The handles C C are connected with the beam by means of perforated plates and staples $f\ f$, which serve as hinges. The draw-bars $d\ d$ are provided with screws and nuts to secure the standards and to adjust the plows to run shallow or deep, as may be desired. The draw-bars $d\ d$ are hooked, by loops in their ends, over hooks $h\ h$, bolted to the sides of the plow-beam. This manner of fastening the handles and the draw-bars to the sides of the plow-beam will admit of a free adjustment of both, so as to bring them nearer together or farther apart, as may be required for different kinds of work.

The plowshare and land-side are made of one piece of sheet metal. (Steel is preferable.) The sheet of steel may be cut near one side, and the strip forming the land-side bent down at a proper angle, and the share compressed in dies to assume the required form.

The protecting-plate $i$ is fastened to the plow-standard above the land-side, and serves to close up the opening on that side, and performs the function of preventing the clods of earth from falling upon the corn when the corn is small and when the earth is plowed from the corn-hills, which is the usual mode of plowing corn the first time.

The perforated plates or bars $a\ a$ are secured by rivets in the center of the plow-beam in mortises or in a slot, and a corresponding mortise or slot is made in the tongue $j$, through which the bars $a\ a$ will pass. In the plates or bars $a\ a$ there may be two or more holes, in which wooden pins may be inserted to retain the tongue $j$ on the front end of the plow-beam. The tongue serves to regulate the depth of the furrows. The double-trees are fastened to the under side of the front end of the plow-beam.

It will be seen that the plows may be reversed in position, so as to throw the earth to or from the corn, and the plow may be used, by proper adjustment for the purpose, to plow on each side of a row of corn; or both plows may run between the same rows at the same time.

The plow may also be used for ridging ground and for furrowing out for corn.

One prominent advantage of my improved plow consists in the manner of fastening the tongue to the beam.

When in use, if the plows, or either of them, are caught and stopped by roots, stumps, or other obstacles, the wooden pin in the front bar or plate, $a$, will break off and allow the front end of the plow-beam to fall to the ground, giving sufficient time for the team to stop before any injury or breakage can occur. When the front pin breaks, the tongue will freely detach itself from the beam, as its rear under side or corner is beveled off for that purpose.

Having fully described my invention, what I claim, and desire to secure by Letters Patent, is—

1. The manner of attaching the tongue to the plow by means of the perforated plates $a\ a$ and pins $b\ b$, arranged and operating in the manner and for the purpose described.

2. The combination of the protecting-plate $c$, inclosing the land-side of the plow, with the mold-board and land-side, made of one piece of metal, substantially as described, for the purpose specified.

3. The hinged draw-bars $d\ d$, with their adjusting nuts and screws, in combination with the adjusting-frame composed of screw-rods $e\ e$ and cross-bar $g$, with their nuts and adjustable handles, arranged and operating in the manner and for the purpose set forth.

Witness my hand this 28th day of June, 1866.

CHRISTIAN ZIMMERMAN.

Witnesses:
   H. P. K. PECK,
   Z. DOTY.